Aug. 7, 1951 R. F. FOSTER 2,563,525

IMAGE SIZE CONTROL DEVICE FOR CATHODE-RAY TUBES

Filed Dec. 15, 1948

Inventor:
Raymond F. Foster,
by Merton D. Moore
His Attorney.

Patented Aug. 7, 1951

2,563,525

UNITED STATES PATENT OFFICE 2,563,525

IMAGE SIZE CONTROL DEVICE FOR CATHODE-RAY TUBES

Raymond F. Foster, Syracuse, N. Y., assignor to General Electric Company, a corporation of New York Application December 15, 1948, Serial No. 65,334

1 Claim. (Cl. 313—79)

This invention relates to cathode ray tubes generally and more particularly to apparatus for controlling the deflection of a cathode ray beam on the fluorescent end wall of such a tube.

Cathode ray tubes generally employ in cooperation therewith apparatus for deflecting the light spot produced by the cathode ray beam on the fluorescent end wall. A common use for such a tube is the reproduction of images in television receivers as a modulation of the light intensity on the end wall of the tube. In such an application circuits are provided to deflect the cathode ray beam at a predetermined repetition rate, both horizontally and vertically to form a raster. Two systems are in general use for deflecting the cathode ray beam to produce this raster. One system, commonly known as electrostatic deflection, uses deflecting electrodes disposed in the neck of the cathode ray tube for deflecting the cathode ray beam by means of electrical potentials applied to them. The other system uses windings for producing a magnetic field through the neck of the tube, and provides deflection of the cathode ray beam by varying the current through these windings.

My invention relates particularly to this latter type of deflection system. The total deflection of the cathode ray beam determines the size of the raster and thereby controls the size of the image on the end wall of the cathode ray tube. Heretofore various methods have been used for controlling the size of the image. The most obvious one consists of controlling the magnitude of the deflecting current flowing through the deflection coils. Where the deflecting voltages are large, controlling their magnitude becomes quite complicated. This is especially true in cathode ray tubes employed in television receivers which utilize very high voltages to provide images of a sufficient brilliancy for daytime operation.

It is an object of my invention to provide a new and improved device for controlling the deflection of a cathode ray in a tube utilizing electromagnetic deflection.

Another object of my invention is to provide a mechanically adjustable device for controlling the size of the image on the end wall of a cathode ray tube utilizing electromagnetic deflection.

A further object of this invention is to provide a mechanically adjustable device for controlling the size of an image on the end wall of a cathode ray tube utilizing electromagnetic deflection coils with deflection currents of constant magnitude flowing therein.

For further objects and advantages and for a better understanding of the invention, attention is now directed to the following description and accompanying drawings and also to the appended claims in which the features of the invention believed to be novel are more particularly pointed out.

Figure 1:
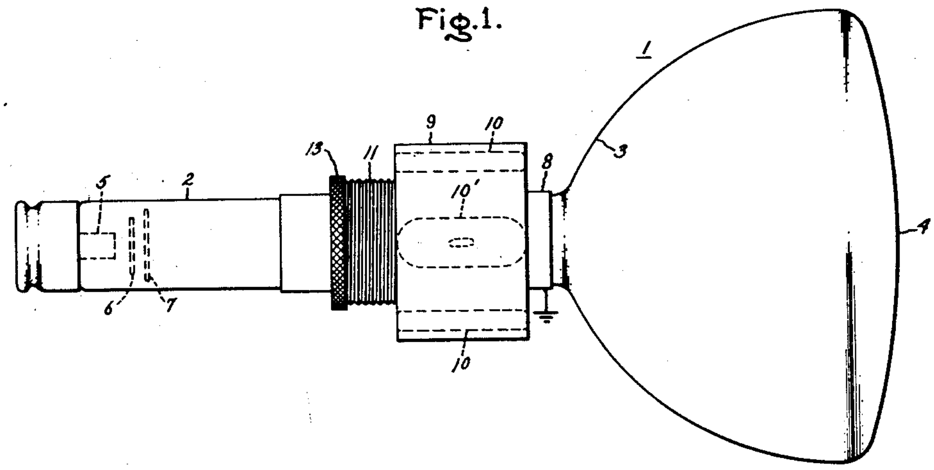

In the accompanying drawings: Fig. 1 is a side elevational view of a cathode ray tube utilizing electromagnetic deflection and employing my invention; and Fig. 2 is a cross-sectional view in side elevation of the same tube to illustrate the internal construction of the device embodying my invention.

Referring now to Fig. 1, there is shown a conventional cathode ray tube 1, suitable for use in a television receiver and comprising an evacuated envelope having a neck portion 2, a flared portion 3, and a fluorescent screen or end wall 4. The cathode ray tube 1 includes a cathode 5, a control electrode 6, and an accelerating electrode 7. Surrounding the neck portion 2 is a piece of tubing 8 which is coated with a conducting material which can be grounded to prevent sparking when high potentials are applied to the tube. Surrounding the neck of the tube near its junction with the flared portion 3 is a deflection yoke 9 comprising a pair of deflection coils 10 wound around a vertical axis and another pair of deflecting coils 10' wound around a horizontal axis both axes being normal to the longitudinal axis of the neck portion of the tube. The yoke 9 is made of a magnetic material and forms a band or ring completely surrounding the deflection coils. Threaded sleeve 11 composed of a low hysteresis magnetic material such as, for example, iron dust in a resin binder, is arranged to screw into an inner threaded bushing 12 inside the yoke 9. This bushing is composed of a nonmagnetic material. The outer end of the sleeve 11 is formed into a knurled portion 13 to facilitate grasping it when it is desired to screw it into the yoke.

Figure 2:
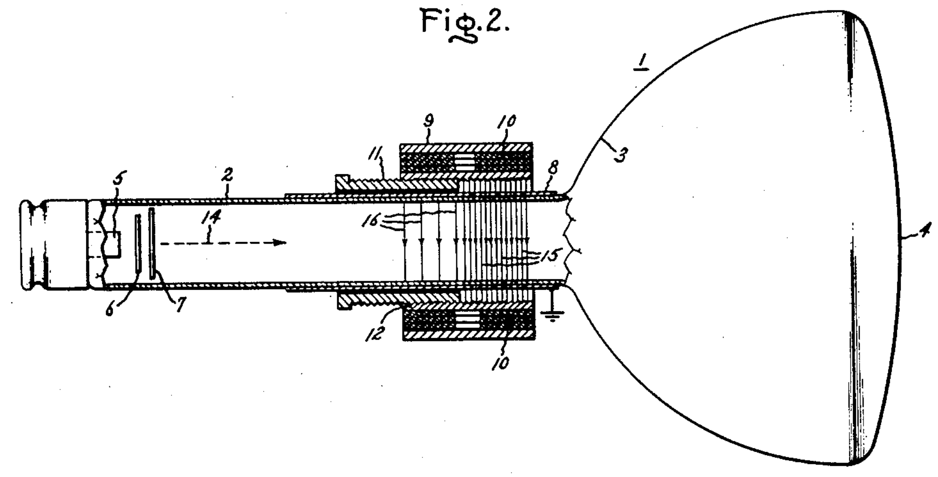

Referring to Fig. 2, the internal arrangement of the yoke 9 and windings 10 is more conveniently illustrated in cross section. The windings 10 consist of two flat or "pancake" coils symmetrically disposed about a vertical axis on either side of the neck portion 2.

In operation, the cathode 5, in cooperation with the electrodes 6 and 7, produces a stream of electrons which travel to the right through the neck portion of the tube as indicated by the arrow 14 and which upon striking the fluorescent screen or end portion 4 produce a luminescent spot. The magnetic field produced through the neck portion is indicated by the arrowed lines 15. While passing through this magnetic field, the electrons are subject to a force at right angles to both their direction of travel and the magnetic field acting upon them. In the illustration, considering the windings 10 as disposed about a vertical axis, this force would cause a horizontal deflection of the cathode ray.

The amount of the deflection increases with the intensity and with the length of the magnetic field through which the electrons travel. The current through the windings 10 is continuously varied between predetermined limits to cause a repeated deflection of the beam across the end wall. This produces, in combination with a vertical deflection caused by the horizontally disposed coils 10', the raster for television reception. Any reduction in the intensity of the magnetic field 15 will diminish the size of the image produced on the end wall. In accordance with my invention, this is accomplished by the sleeve 11 which provides for the magnetic flux, a path of lower reluctance than the direct path through the tube. Accordingly, part of the magnetic flux which would normally be present in the neck of the tube is confined within the portion of the sleeve coming under the yoke. The remaining flux through the neck of the tube is diminished as indicated by the arrowed lines 15. Accordingly, the total magnetic flux through the neck portion is decreased, or equivalently, the length of the magnetic field is effectively reduced, and the angular bending or the total deflection of the cathode ray on the end wall is also decreased.

By screwing the sleeve 11 deeper into the yoke, a larger portion of the magnetic flux is shunted by it and the deflection of the cathode ray beam is further decreased. Thus the size of the image can be controlled by screwing the sleeve 11 in and out of the yoke without changing the magnitude of the deflecting currents applied to the windings 10 and 11. The sleeve 11 operates not only on the vertical flux to produce horizontal deflection but also on the horizontal flux to produce vertical deflection. The same shunting effect occurs on both fluxes and accordingly the total horizontal and vertical deflection is reduced in the same proportion. This conserves the shape of the raster, or in other words, the ratio of its horizontal to vertical dimension.

While a specific embodiment has been shown and described, it will, of course, be understood that various modifications may be made without departing from the invention. Thus, while I have described the sleeve 11 as composed of iron dust in a resin binder, it may equally well be composed of a number of flat annular rings bound together, or by a thin sheet of low permeability metal formed into a cylinder. Also various means may be utilized for sliding the sleeve in or out of the yoke and other modifications will be apparent to those skilled in the art. The appended claims are, therefore, intended to cover any such modifications within the true spirit and scope of the invention.

What I claim as new and desire to secure by Letters Patent of the United States is:

An image size control structure for a cathode ray tube deflection system comprising an evacuated member having a neck portion, a fluorescent end wall, and means for projecting a cathode ray beam through said portion and upon said end wall, a deflection yoke of magnetic material having an inner non-magnetic threaded bushing comprising a pair of coordinate ray deflection windings external to said portion for producing through said portion horizontal and vertical magnetic deflecting fields both substantially transverse to the direction of propogation of said beam, said windings being adapted to be energized with varying deflection currents for correspondingly deflecting said beam upon said end wall, and a threaded tubular sleeve composed of a low hysteresis magnetic material closely surrounding said neck portion, said threaded sleeve having an outer diameter smaller than the internal dimensions of said windings and being adapted to screw into said threaded bushing, the axial length of said threaded sleeve being sufficient to permit its insertion between said windings and said portion for shunting a substantial part of both said magnetic fields and reducing the amplitude of said deflection in both directions.

RAYMOND F. FOSTER.

REFERENCES CITED

The following references are of record in the file of this patent:

UNITED STATES PATENTS

| Number | Name | Date |
|---|---|---|
| 1,995,376 | Campbell | Mar. 26, 1935 |
| 2,102,421 | Kuehni | Dec. 14, 1937 |
| 2,153,643 | Roosenstein et al. | Apr. 11, 1939 |
| 2,157,182 | Maloff | May 9, 1939 |
| 2,185,857 | Lubszynski et al. | Jan. 2, 1940 |
| 2,219,193 | Mynall | Oct. 22, 1940 |
| 2,431,077 | Poch | Nov. 18, 1947 |
| 2,442,975 | Grundmann | June 8, 1948 |
| 2,494,459 | Torsch | Jan. 10, 1950 |

FOREIGN PATENTS

| Number | Country | Date |
|---|---|---|
| 472,165 | Great Britain | Sept. 13, 1937 |
| 856,503 | France | Mar. 23 1940 |